F. A. MECKERT AND L. E. BOCK.
RESILIENT, NON-PUNCTURABLE, AND DEMOUNTABLE TIRE.
APPLICATION FILED APR. 25, 1918.
1,347,585.  Patented July 27, 1920.
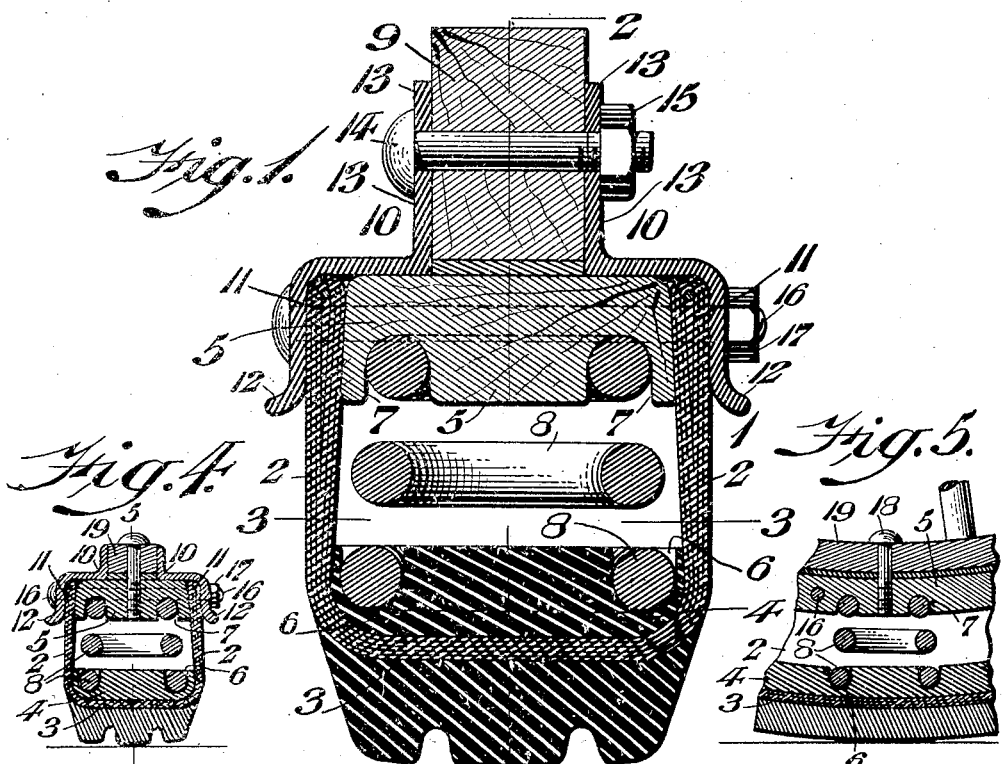
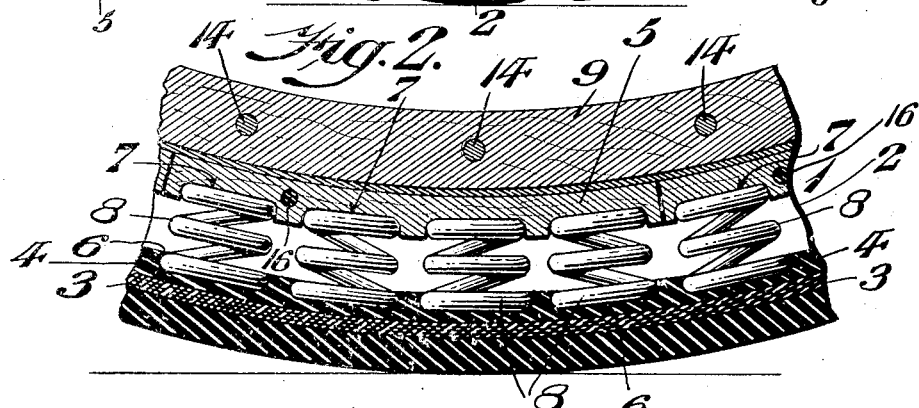
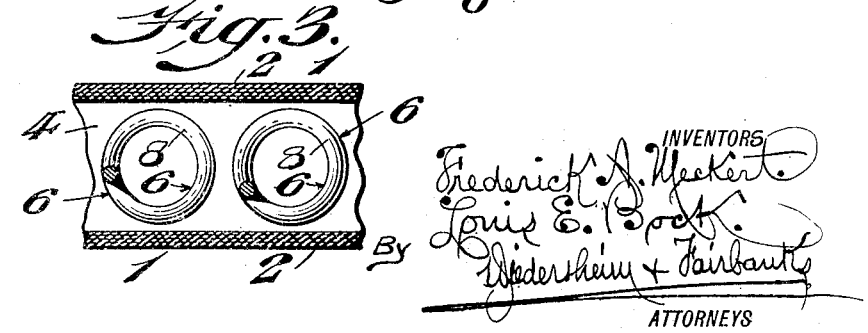

UNITED STATES PATENT OFFICE.

FREDERICK A. MECKERT AND LOUIS E. BOCK, OF PHILADELPHIA, PENNSYLVANIA.

RESILIENT, NON-PUNCTURABLE, AND DEMOUNTABLE TIRE.

1,347,585.   Specification of Letters Patent.   Patented July 27, 1920.

Application filed April 25, 1918. Serial No. 230,783.

*To all whom it may concern:*

Be it known that we, FREDERICK A. MECKERT and LOUIS E. BOCK, both citizens of the United States, residing in the city and county of Philadelphia, State of Pennsylvania, have invented a new and useful Resilient, Non-Puncturable, and Demountable Tire, of which the following is a specification.

Our invention consists of a tire which is not puncturable, of light, durable and inexpensive construction, and is economical in use, and advantages are presented as will be hereinafter stated.

The invention is satisfactorily illustrated in the accompanying drawing, but the important instrumentalities thereof may be varied, and so it is to be understood that the invention is not limited to the specific details shown and described, as long as they are within the spirit or scope of the claims.

Figure 1 represents a transverse section of a tire embodying our invention.

Fig. 2 represents a section on line 2—2 Fig. 1 on a reduced scale.

Fig. 3 represents a section on line 3—3 Fig. 1.

Fig. 4 represents a transverse section somewhat similar to Fig. 1 on a vastly reduced scale. Fig. 5 represents a section thereof on line 5—5 Fig. 4.

Figs. 4 and 5 show a form somewhat modified from what exists in the other figures.

Similar numerals of reference indicate corresponding parts in the figures. Referring to the drawings, 1 designates the tire proper, the same being composed of sides 2 which are right lined in their radial direction, and the outer peripheral wall 3 whose tread is comparatively flat, said walls being formed of fabric and comprising a hollow body or the shoe of the tire which is open on its inner periphery.

Imposed on the inner face of the outer peripheral wall 3 is the circular rim 4 which is formed of hard rubber and at the inner periphery of the tire is the circular rim 5 which is formed of wood.

In the inner face of the rim 4 are the circular recesses 6, and in the outer face of the rim 5 are the circular recesses 7.

Interposed in the tire at intervals between the rims 4 and 5 are the helical or spiral springs 8 whose terminal convolutions are seated individually respectively in the registering recesses 6 and 7 of the opposite rims 4 and 5, thus preventing shifting, creeping and displacement of any of the springs in the tire, it being noticed that the rims 4, 5 and springs 8 are readily insertible in the tire through the open inner periphery thereof, and that the coils of the springs 8 are tapering from the tread portion of the tire to their opposite ends, and the sides of the tire 1 are right lined and flat as is also the peripheral wall 3 of the tire.

In order to connect the tire with the felly 9 we employ the rims 10 which are somewhat double L-shaped in cross section so as to embrace in part the inner peripheral portion of the tire 1, said portion being thickened forming the shoulder 11 which is clasped by the adjacent portions 12 of the rims 10, thus interlocking said rims with said tire and vice versa. The other portions of the rims forming the necks 13 are firmly connected with the felly 9 by means of the bolts 14 which are passed through said necks and felly and are tightened by the nuts 15 thus providing a firm connection for the tire with the felly, but when said nuts are unscrewed the rims 10 may be removed from the felly and tire, thus adapting the latter to be demounted in a convenient manner.

It will be seen that by the construction presented as above there is a saving in the cost and maintenance of the auto vehicle, less tire trouble, more mileage, less waste of rubber, smaller wheels may be employed, better tread-giving, thus providing greater tractive power and affording less chance of skidding, no danger of blow-outs, greater durability owing to the tire having only wear and no strain, these being due to compression of air which exists in an inflatable or pneumatic tube which is not employed by us, greater flexibility in the tire without such tube and increased riding qualities of the vehicle, while the tire is easy of application and removable.

As additional means of retaining the wooden rim 5 in position and preventing creeping thereof, we employ the bolts 16 which are passed transversely through the limbs or portions 12 of the angular rims 10, and said rim 5, and held tightly in place by the nuts 17 which are screwed on said bolts and tightened against said limbs or portions 12, thus clamping the sides of the tire 1, and the rim 5, the latter being formed in sections, said bolts 16 passing at intervals through said sections, as most plainly shown in Fig. 2. In the form shown in Figs. 4 and 5 bolts 18 are passed radially at substantially right angles to the bolts 16 as shown at intervals through the felly 19 between the spokes of the wheel to which the tire is applied, into the sections of the rim 5, said felly being of metal, that in the other figure being of wood, thus providing additional means for retaining said rim in position, and preventing creeping thereof.

Having thus described our invention what we claim as new and desire to secure by Letters Patent, is:—

1. A tire composed of a hollow body comprising a shoe, a rim of rigid material within the shoe adjacent the inner periphery thereof, a rim within the shoe adjacent the tread thereof, resilient means in said body between said rims and unattached thereto, said rims and resilient means being insertible in said body through the open inner periphery thereof, members substantially doubly angular in cross section having portions engaging the inner peripheral portion of said body and other portions engageable with a felly, and means passed through the body engaging portions of said members and through the first-named rim.

2. A tire composed of a hollow body comprising a shoe, a rim of rigid material within the shoe adjacent the inner periphery thereof, a rim within the shoe adjacent the tread thereof, resilient means in said body between said rims and unattached thereto, said rims and resilient means being insertible in said body through the open inner periphery thereof, members substantially doubly angular in cross section having portions engaging the inner peripheral portions of said body, and means passed through the body engaging portions of the said members and through the first-named rim, portions of said doubly angular members forming a neck embracing the felly, and means passed through the felly and engaging said first-named rim, said last-named means being disposed at an angle to the first-named means.

FREDERICK A. MECKERT.
LOUIS E. BOCK.

Witnesses:
JOHN M. WIEDERSHEIM,
N. BUSSINGER.